(12) United States Patent
Law

(10) Patent No.: US 11,918,126 B2
(45) Date of Patent: Mar. 5, 2024

(54) WINDOW STRUCTURE FOR VISUALIZING THE INTERNAL STRUCTURE OF UPHOLSTERED FURNITURE AND SEATS

(71) Applicant: IGO FURNITURE (GAO AN) LIMITED, Jiangxi (CN)

(72) Inventor: Chi-Po Law, Jiangxi (CN)

(73) Assignee: IGO FURNITURE (GAO AN) LIMITED, Yichun (CN)

( * ) Notice: Subject to any disclaimer, the term of this patent is extended or adjusted under 35 U.S.C. 154(b) by 21 days.

(21) Appl. No.: 17/752,777

(22) Filed: May 24, 2022

(65) Prior Publication Data

US 2023/0232988 A1    Jul. 27, 2023

(30) Foreign Application Priority Data

Jan. 22, 2022   (CN) .......................... 202210075668.7

(51) Int. Cl.
*A47C 7/74* (2006.01)
*A47C 7/24* (2006.01)

(52) U.S. Cl.
CPC ................ *A47C 7/24* (2013.01); *A47C 7/746* (2013.01)

(58) Field of Classification Search
CPC .................................. A47C 7/24; A47C 7/746
See application file for complete search history.

(56) References Cited

U.S. PATENT DOCUMENTS

| | | | |
|---|---|---|---|
| 9,265,330 B1* | 2/2016 | Golin | A45F 3/04 |
| 2013/0033079 A1* | 2/2013 | Sei | B60N 2/5825 |
| | | | 297/353 |
| 2013/0119744 A1* | 5/2013 | Panozzo | A47C 7/16 |
| | | | 297/452.58 |
| 2019/0200770 A1* | 7/2019 | Lan | A63B 71/00 |
| 2019/0380451 A1* | 12/2019 | Geist | B60R 22/48 |
| 2020/0055427 A1* | 2/2020 | Styn | B60N 2/6009 |
| 2020/0122606 A1* | 4/2020 | Koehler | B60N 2/0228 |
| 2020/0398718 A1* | 12/2020 | Watanabe | B60R 22/26 |
| 2021/0221194 A1* | 7/2021 | Arata | B60N 2/5635 |
| 2021/0237632 A1* | 8/2021 | Upendram | B60N 2/5685 |
| 2021/0276463 A1* | 9/2021 | Wolas | B60N 2/5671 |
| 2022/0379784 A1* | 12/2022 | Sacco | B60N 2/6009 |

\* cited by examiner

*Primary Examiner* — Rodney B White
(74) *Attorney, Agent, or Firm* — Georgi Korobanov

(57) ABSTRACT

The present disclosure provides a window structure for visualizing the internal structure of upholstered furniture and including abase, a side surface of the base is provided with installation grooves, inner walls of the installation grooves are provided with transparent windows, an inner wall of the base is equipped with a seat board, a top surface of the seat board is equipped with a shaping layer, and a top surface of the shaping layer is equipped with an elastic layer. An outer layer, the elastic layer and the shaping layer can improve the comfort of the user; an elastomer layer has good impact resistance, always returns to shape and is not easy to be damaged, can improve the service life of the present disclosure; through the transparent windows, a user can conveniently view the internal structure of the present disclosure; the ventilation grooves play the role of ventilation.

7 Claims, 4 Drawing Sheets

WINDOW STRUCTURE FOR VISUALIZING THE INTERNAL STRUCTURE OF UPHOLSTERED FURNITURE AND SEATS

TECHNICAL FIELD

The present disclosure relates to the technical field of furniture, in particular to a window structure for visualizing the internal structure of upholstered furniture and seats.

BACKGROUND ART

Furniture refers to a broad category of appliances and facilities that are essential for human beings to maintain normal life, engage in production practices and carry out social activities. However, the interior of the existing soft furniture is mostly composed of PU foam or springs, and the user cannot see the structure or composition of the soft package, therefore, the user is prone to doubt and distrust the quality of the product, which is not conducive to the establishment of mutual confidence between the product and the consumer, at present, the structure visualization technology adopted by a small number of new furniture is generally through the leather cover and zipper, and the zipper is opened through the leather cover to see the structure such as the foam inside, although this kind of structure visualization technology can achieve the effect of visualization, it takes time to dismantle, the practicability is poor, and it needs to be improved.

SUMMARY

The object of the present disclosure is to propose a window structure for visualizing the internal structure of upholstered furniture and seats in order to solve the shortcomings existing in the prior art.

In order to achieve the above object, the present disclosure adopts the following technical scheme: a window structure for visualizing the internal structure of upholstered furniture and seats, comprising a base, a side surface of the base is provided with installation grooves, and the inner walls of the installation grooves are provided with transparent windows, the inner wall of the base is equipped with a seat board, the top surface of the seat board is equipped with a shaping layer, and the top surface of the shaping layer is equipped with an elastic layer, an elastomer layer is fixedly mounted on the top surface of the elastic layer, and an outer layer is mounted on the top surface of the elastomer layer, the shapes of installation grooves and transparent windows are any one of rectangle, circle, polygon, honeycomb, triangle and irregular graphic.

In order to limit the elastic layer and the elastomer layer, the present disclosure improves that limiting grooves are provided on the side of the shaping layer, limiting blocks are fixedly installed on the sides of the elastic layer and the elastomer layer.

In order to preliminarily limit the elastic layer, the elastomer layer and the shaping layer, so as to facilitate bonding by glue, the present disclosure improves that the limiting blocks are the same size as the limiting grooves, the limiting blocks are symmetrically distributed on both sides of the elastic layer and the elastomer layer, and the limiting grooves are symmetrically distributed on both sides of the shaping layer.

In order to improve the softness, the present disclosure improves that the outer layer, the elastic layer and the shaping layer are all made of polyurethane foam.

In order to improve the impact resistance of the present disclosure, the present disclosure improves that the elastomer layer is made of TPE material, that is, thermoplastic elastomer, the material of the transparent windows is TPU, that is, thermoplastic polyurethane elastomer rubber.

In order to facilitate the circulation of air, the present disclosure improves that buckles are fixedly installed on the sides of the transparent window, and the buckles are symmetrically distributed on both sides of the transparent window, ventilation grooves are arranged on the surface of the transparent window near the edge.

In order to improve the resilience and softness of the present disclosure the present disclosure improves that the inner wall of the shaping layer is fixedly installed with polyurethane foam columns, and the polyurethane foam columns are distributed on the inner wall of the shaping layer according to the body shape of the human.

Compared with the prior art, the present disclosure has the following advantages and positive effects.

In the present disclosure, the materials of the outer layer, the elastic layer and the shaping layer are all adapted to the body shape, meet ergonomic requirements, and are also relatively soft, which can improve the comfort of the user when using, at the same time, the elastomer layer has good impact resistance, is not easy to be damaged, and can improve the service life of the present disclosure at the same time, through the transparent windows, the user can conveniently view the internal structure of the present disclosure so that the user can trust the quality of the product, at the same time, the ventilation grooves arranged on the transparent window can facilitate the air circulation in the present disclosure, so that the ventilation can be improved while visualizing, at the same time, the generation of air flow can reduce the surface heat of the present disclosure, so that the surface of the present disclosure can keep cool and dry, thereby ensuring the free movement of the foam structure and the drying inside the structure of the present disclosure, and improving the user experience, in addition, the transparent window is mainly clamped in the installation groove through the buckle, and the connection mode of the buckle can facilitate the installation and disassembly of the transparent window, and has high practicability.

Figure 1:
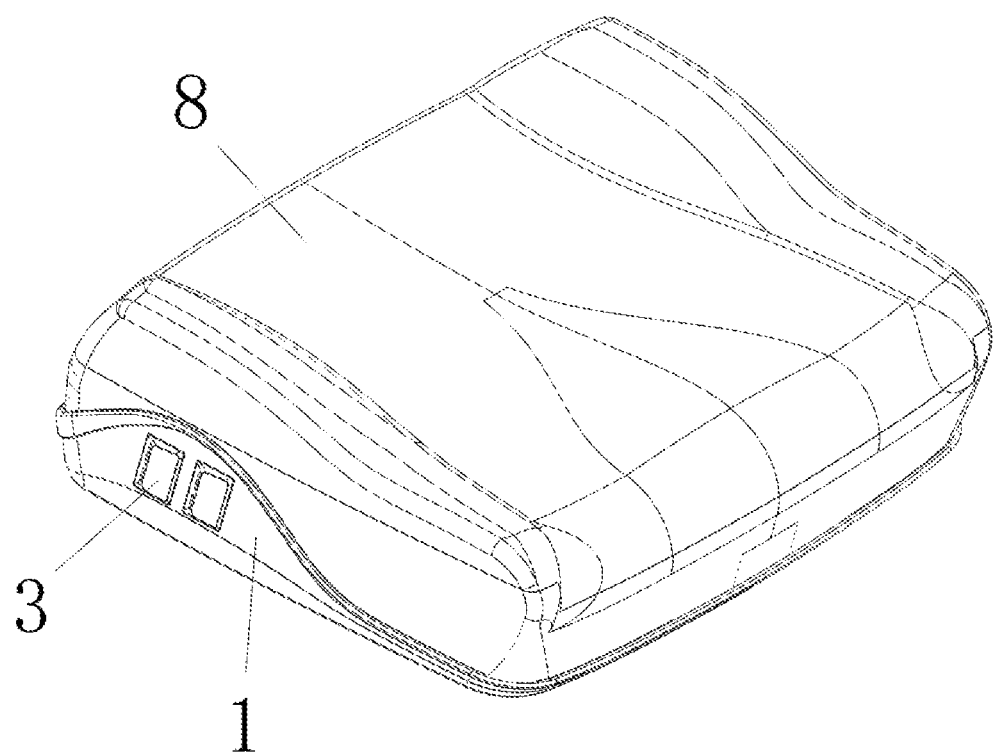
FIG. 1 is a schematic diagram of a window structure for visualizing the internal structure of upholstered furniture and seats proposed by the present disclosure.
Figure 2:
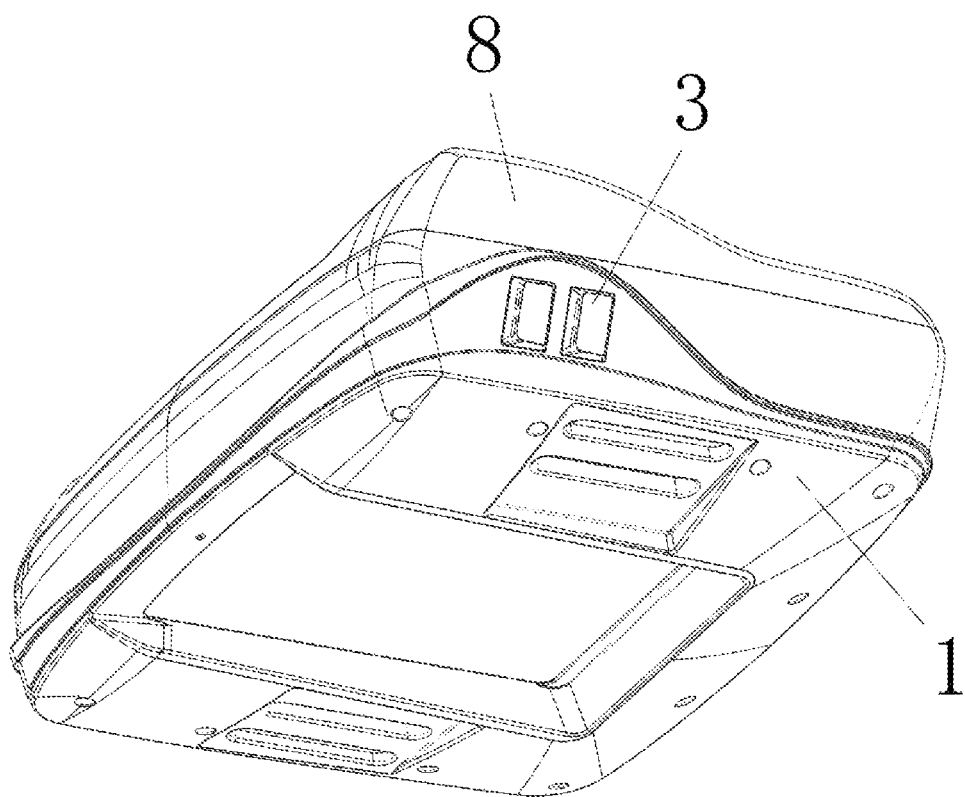
FIG. 2 is a side view of a window structure for visualizing the internal structure of upholstered furniture and seats proposed by the present disclosure.

1 base, 2 installation groove, 3 transparent window, 4 seat board, 5 shaping layer, 6 elastic layer, 7 elastomer layer, 8 outer layer, 9 limiting groove, 10 limiting block, 11 buckle, 12 polyurethane foam column, 13 ventilation groove.

DESCRIPTION OF EMBODIMENT

In order to more clearly understand the above objects, features and advantages of the present disclosure the present disclosure will be further described below in combination with the accompany drawings and embodiments. It should be noted that the embodiments of the present disclosure and the features in the embodiments may be combined with each other in the case of no conflict.

Many specific details are set forth in the following description to facilitate a full understanding of the present disclosure, however, the present disclosure can also be implemented in other ways different from those described herein, therefore, the present disclosure is not limited to the limitations of the specific embodiments of the following public specification.

Embodiment 1

Referring to FIG. 1-5, the present disclosure provides a technical scheme: a window structure for visualizing the internal structure of upholstered furniture and seats, comprising a base 1, a side surface of the base 1 is provided with installation grooves 2, the installation grooves 2 are used to install transparent windows 3 and the inner walls of the installation grooves 2 are provided with transparent windows 3, buckles 11 are fixedly installed on the sides of the transparent window 3, and the buckles 11 are symmetrically distributed on both sides of the transparent window 3, the transparent window 3 can be clamped in the installation groove 2 through the buckle 11, ventilation grooves 13 are arranged on the surface of the transparent window 3 near the edge, the ventilation grooves 13 can facilitate the air circulation in the present disclosure thereby ensuring the drying inside the present disclosure avoiding excessive moisture and affecting the user experience, the inner wall of the base 1 is equipped with a seat board 4, the top surface of the seat board 4 is equipped with a shaping layer 5, the inner wall of the shaping layer 5 is fixedly installed with polyurethane foam columns 12, and the polyurethane foam columns 12 are distributed on the inner wall of the shaping layer 5, the polyurethane foam columns 12 can further improve the resilience and softness of the present disclosure, ensuring user experience, limiting grooves 9 are provided on the side of the shaping layer 5, limiting grooves 9 are symmetrically distributed on both sides of the shaping layer 5.

Figure 3:
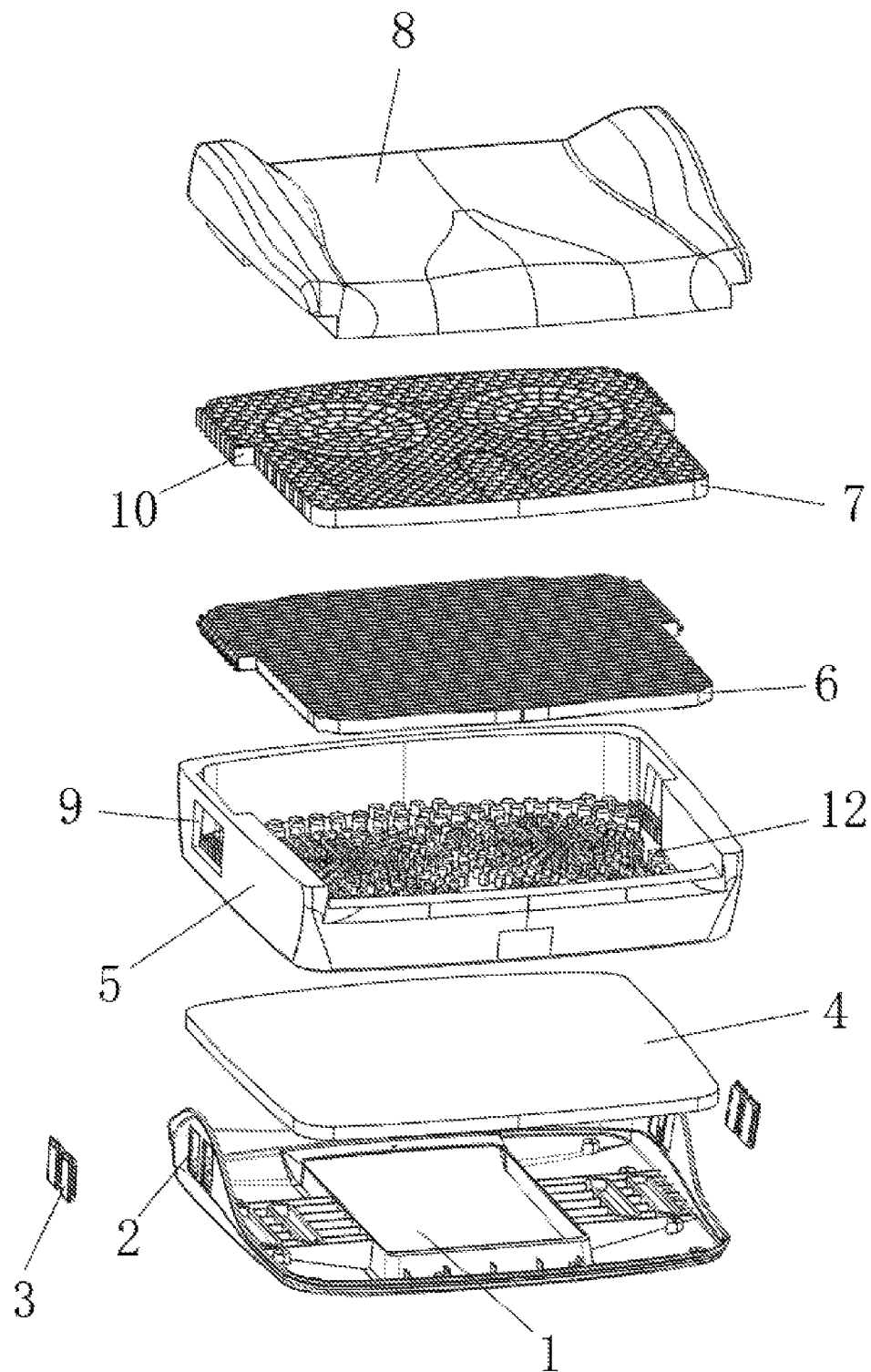
FIG. 3 is an exploded view of a window structure for visualizing the internal structure of upholstered furniture and seats proposed by the present disclosure.
Figure 4:
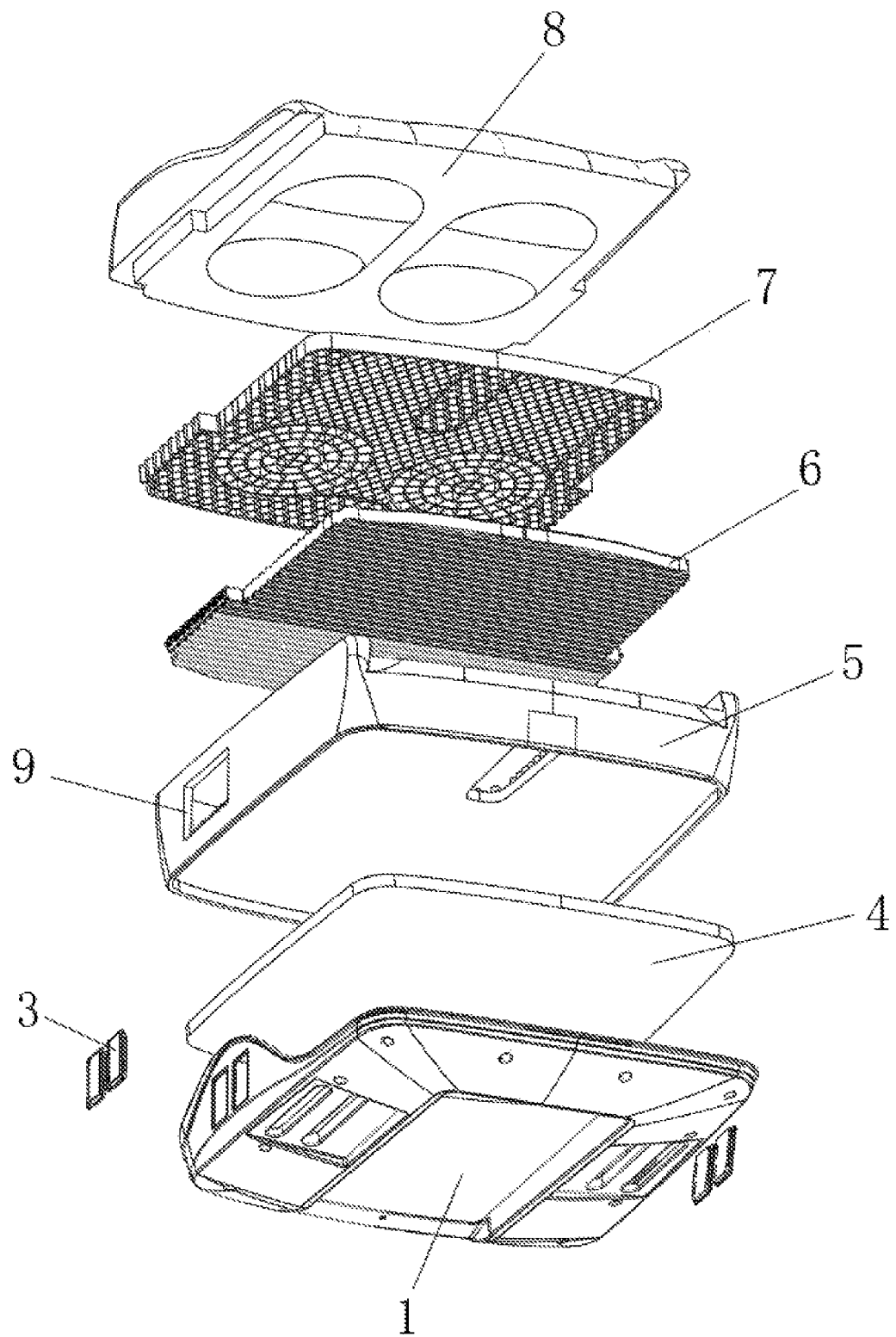
FIG. 4 is an exploded view of the bottom view of a window structure for visualizing the internal structure of upholstered furniture and seats proposed by the present disclosure.
Figure 5:
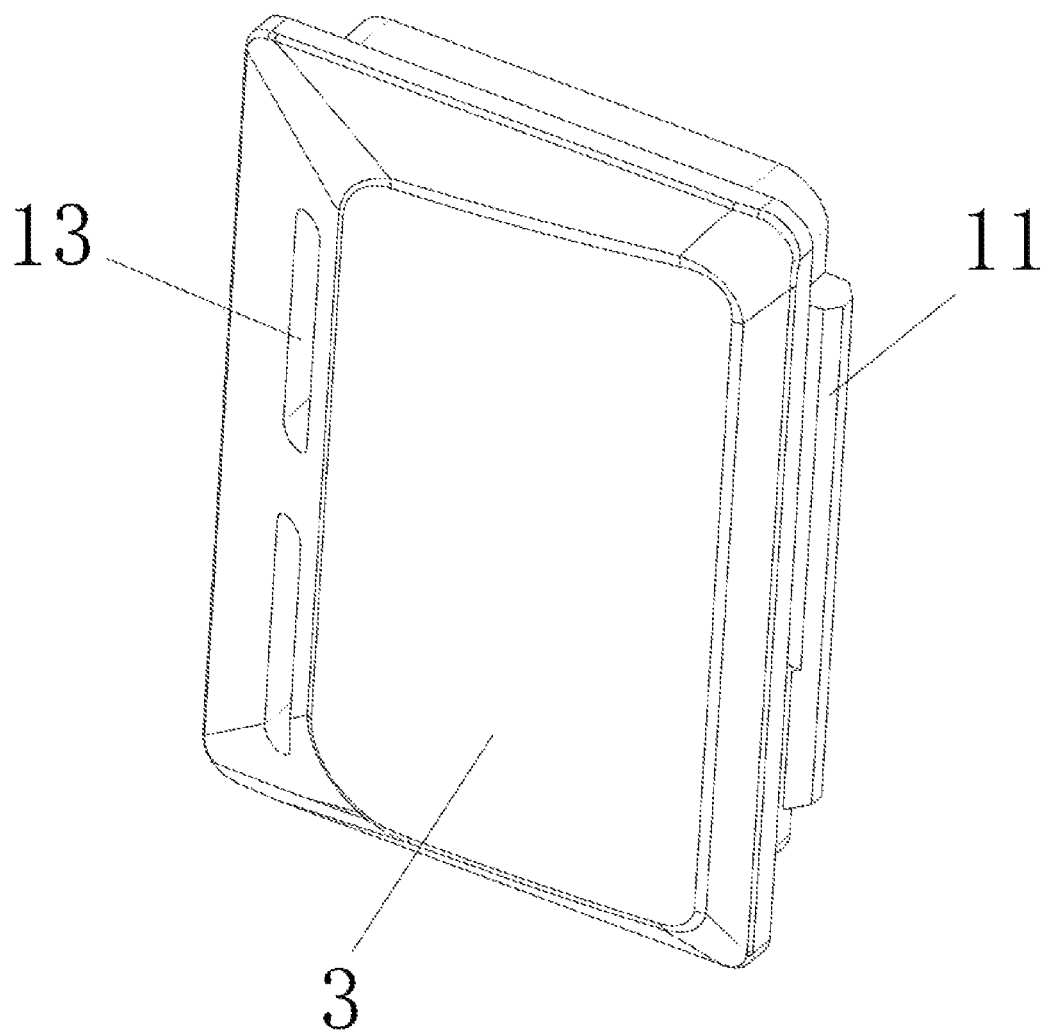
FIG. 5 is a schematic diagram of the transparent window in a window structure for visualizing the internal structure of upholstered furniture and seats proposed by the present disclosure.

Referring to FIG. 3-4, the top surface of the shaping layer 5 is equipped with an elastic layer 6, a elastomer layer 7 is fixedly mounted on the top surface of the elastic layer 6, limiting blocks 10 are fixedly installed on the sides of the elastic layer 6 and the elastomer layer 7, the limiting blocks 10 are the same size as the limiting grooves 9, the limiting blocks 10 are symmetrically distributed on both sides of the elastic layer 6 and the elastomer layer 7, the elastomer layer 7 is made of TPE material, that is, thermoplastic elastomer, the thermoplastic elastomer has better impact resistance, is not easy to be damaged, and can improve the service life of the present disclosure, the material of the transparent windows 3 is TPU, that is, thermoplastic polyurethane elastomer rubber, the thermoplastic polyurethane elastomer rubber has the advantage of long service life, an outer layer 8 is mounted on the top surface of the elastomer layer 7, the outer layer 8, the elastic layer 6 and the shaping layer 5 are all made of polyurethane, the shapes of installation grooves 2 and transparent windows 3 are any one of rectangle, circle, polygon, honeycomb, triangle and irregular graphic.

Working principle: the materials of the outer layer 8, the elastic layer 6 and the shaping layer 5 are all adapted to the body shape, meet ergonomic requirements, and are also relatively soft, which can improve the comfort of the user when using, at the same time, the elastomer layer 7 has good impact resistance, is not easy to be damaged, and can improve the service life of the present disclosure, at the same time, through the transparent windows 3, the user can conveniently view the internal structure of the present disclosure so that the user can trust the quality of the product, at the same time, the ventilation grooves 13 arranged on the transparent window 3 can facilitate the air circulation in the present disclosure, so that the ventilation can be improved while visualizing, at the same time, the generation of air flow can reduce the surface heat of the present disclosure so that the surface of the present disclosure can keep cool and dry, thereby ensuring the free movement of the foam structure and the drying inside the structure of the present disclosure and improving the user experience, in addition, the transparent window 3 is mainly clamped in the installation groove 2 through the buckle 11, and the connection mode of the buckle 11 can facilitate the installation and disassembly of the transparent window 3, and has high practicability.

The above descriptions are only preferred embodiments of the present disclosure, and are not intended to limit the present disclosure in other forms, any person skilled in the art may use the above disclosed technical content to change or modify into equivalent embodiments of equivalent changes for application in other fields, however, any simple modifications, equivalent changes and modifications made to the above embodiments according to the technical essence of the present disclosure without departing from the technical schemes of the present disclosure still belong to the protection scope of the technical schemes of the present disclosure.

The invention claimed is:

1. A window structure for visualizing the internal structure of upholstered furniture and seats, comprising a base (1), a side surface of the base (1) is provided with installation grooves (2), and inner walls of the installation grooves (2) are provided with transparent windows (3), p inner wall of the base (1) is equipped with a seat board (4), a top surface of the seat board (4) is equipped with a shaping layer (5), and a top surface of the shaping layer (5) is equipped with an elastic layer (6), an elastomer layer (7) is fixedly mounted on a top surface of the elastic layer (6), and an outer layer (8) is mounted on a top surface of the elastomer layer (7), shapes of installation grooves (2) and transparent windows (3) are any one of rectangle, circle, polygon, honeycomb, triangle and irregular graphic.

2. The window structure for visualizing the internal structure of upholstered furniture and seats of claim 1, limiting grooves (9) are provided on a side of the shaping layer (5), limiting blocks (10) are fixedly installed on sides of the elastic layer (6) and the elastomer layer (7).

3. The window structure for visualizing the internal structure of upholstered furniture and seats of claim 2, the limiting blocks (10) are the same size as the limiting grooves (9), the limiting blocks (10) are symmetrically distributed on the sides of the elastic layer (6) and the elastomer layer (7), and the limiting grooves (9) are symmetrically distributed on the side of the shaping layer (5).

4. The window structure for visualizing the internal structure of upholstered furniture and seats of claim 1, the outer layer (8), the elastic layer (6) and the shaping layer (5) are all made of polyurethane.

5. The window structure for visualizing the internal structure of upholstered furniture and seats of claim 1, the elastomer layer (7) is comprised of thermoplastic elastomer (TPE) material, the transparent windows (3) are comprised of thermoplastic polyurethane (TPU) elastomer rubber.

6. The window structure for visualizing the internal structure of upholstered furniture and seats of claim 1, buckles (11) are fixedly installed on sides of the transparent windows (3), and the buckles (11) are symmetrically distributed on the sides of the transparent windows (3), ventilation grooves (13) are arranged on a surface of the transparent windows (3) near an edge.

7. The window structure for visualizing the internal structure of upholstered furniture and seats of claim 1, an inner wall of the shaping layer (5) is fixedly installed with polyurethane foam columns (12), and the polyurethane foam columns (12) are distributed on the inner wall of the shaping layer (5) according to the body shape of the human.

\* \* \* \* \*